US012482099B2

(12) United States Patent
Taninai (10) Patent No.: US 12,482,099 B2
(45) Date of Patent: Nov. 25, 2025

(54) IMAGE DIAGNOSIS SUPPORT DEVICE (71) Applicant: FUJIFILM CORPORATION, Tokyo (JP)

(72) Inventor: Koji Taninai, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 315 days.

(21) Appl. No.: 18/330,368

(22) Filed: Jun. 7, 2023

(65) Prior Publication Data

US 2023/0316518 A1 Oct. 5, 2023

Related U.S. Application Data (63) Continuation of application No. PCT/JP2021/045906, filed on Dec. 13, 2021.

(30) Foreign Application Priority Data

Dec. 14, 2020 (JP) ................................. 2020-206926

(51) Int. Cl.
*G06K 9/00* (2022.01)
*A61K 35/12* (2015.01)
*G06T 7/00* (2017.01)

(52) U.S. Cl.
CPC .. *G06T 7/0012* (2013.01); *G06T 2207/10116* (2013.01)

(58) Field of Classification Search
CPC ....... G06K 9/00; A61B 8/4427; G06F 18/253; G06T 7/00

(Continued)

(56) References Cited

U.S. PATENT DOCUMENTS

2008/0097186 A1* 4/2008 Biglieri ................. G16H 30/20
600/407
2011/0110496 A1* 5/2011 Foos ..................... A61B 6/563
378/98.5

(Continued)

FOREIGN PATENT DOCUMENTS

JP 2003-150714 A 5/2003
JP 2012-065947 A 4/2012

(Continued)

OTHER PUBLICATIONS

Impact of a Computer-Aided Detection (CAD) System Integrated into a Picture Archiving and Communication System (PACS) on Reader Sensitivity and Efficiency for the Detection of Lung Nodules in Thoracic CT Exams Luca Bogoni (Year: 2012).*

(Continued)

*Primary Examiner* — Seyed H Azarian
(74) *Attorney, Agent, or Firm* — SOLARIS Intellectual Property Group, PLLC (57) ABSTRACT An image diagnosis support device includes: a CAD processing unit that performs computer-aided diagnostic processing on a medical image; a communication unit that receives the medical image from an external device and transmits information including a result of the computer-aided diagnostic processing by the CAD processing unit to the external device; a power supply unit that supplies power from a battery to the CAD processing unit and the communication unit; and a housing that accommodates the CAD processing unit, the communication unit, and the power supply unit and is portable by a user.

8 Claims, 10 Drawing Sheets (58) Field of Classification Search
USPC ........ 382/100, 103, 106–107, 128–132, 154,
382/156, 168, 181, 214, 219, 224, 254,
382/274, 276, 291, 305, 307; 600/437,
600/407; 378/98.5, 21, 101, 102
See application file for complete search history.

(56) References Cited

U.S. PATENT DOCUMENTS

| | | |
|---|---|---|
| 2011/0317816 A1 | 12/2011 | Bechard et al. |
| 2012/0076265 A1 | 3/2012 | Ohta et al. |
| 2013/0211252 A1* | 8/2013 | Li .................. A61B 8/4427 600/437 |
| 2016/0232425 A1* | 8/2016 | Huang ............... G06F 18/253 |
| 2021/0298685 A1* | 9/2021 | Zeng ................ A61B 5/0022 |

FOREIGN PATENT DOCUMENTS

| | | |
|---|---|---|
| JP | 2013-529513 A | 7/2013 |
| WO | 2013/145822 A1 | 10/2013 |

OTHER PUBLICATIONS

International Search Report issued in International Application No. PCT/JP2021/045906 on Feb. 22, 2022.
Written Opinion of the ISA issued in International Application No. PCT/JP2021/045906 on Feb. 22, 2022.

\* cited by examiner

| No. | ITEM | DATA |
|---|---|---|
| 1 | IMAGE ID | FI001 |
| 2 | IMAGING DATE AND TIME | 11/29/2020 8:05 |
| 3 | PATIENT NAME | FUJI TARO |
| 4 | PATIENT ID | H0500 |
| 5 | SEX | MALE |
| 6 | DATE OF BIRTH | 09/25/1985 |
| 7 | AGE | 35 |
| 8 | HEIGHT | 183 |
| 9 | WEIGHT | 78 |
| 10 | RECEPTION NUMBER | 0027 |
| 11 | OPERATOR NAME | TAIYO JIRO |
| 12 | EXAMINATION SITE | CHEST PART |
| 13 | TUBE VOLTAGE | 100 |
| 14 | TUBE CURRENT | 200 |
| 15 | IRRADIATION TIME | 20 |

IMAGE DIAGNOSIS SUPPORT DEVICE

CROSS-REFERENCE TO RELATED APPLICATION

This application is a continuation application of International Application No. PCT/JP2021/045906, filed Dec. 13, 2021, the disclosure of which is incorporated herein by reference in its entirety. Further, this application claims priority from Japanese Patent Application No. 2020-206926 filed on Dec. 14, 2020, the disclosure of which is incorporated herein by reference in its entirety.

BACKGROUND

1. Technical Field

The technology of the present disclosure relates to an image diagnosis support device.

2. Description of the Related Art

An image diagnosis support device that executes image analysis processing of analyzing a medical image, such as a radiation image, through a computer to provide useful information for diagnosis, such as detection of a lesion in the medical image, is known. This image diagnosis support device is also called a computer-aided diagnosis (CAD) device.

The image diagnosis support device is configured as a stationary server and is connected to an image storage device, such as picture archiving and communication systems (PACS), in a medical facility via a network. A medical image captured by a modality, such as a radiography device, is stored in the PACS. For example, an image diagnosis device executes CAD processing on a medical image on the basis of a request from a terminal device operated by a doctor performing diagnosis in a medical facility and transmits the execution result of the CAD processing to the terminal device as a request source (JP2003-150714A).

In addition, JP2003-150714A discloses that, for example, an image diagnosis device installed in a medical facility, such as a base hospital, and a terminal device of a regional hospital in a remote location are connected via a network so that an image diagnosis support device existing in the base hospital is used from the regional hospital in which the image diagnosis support device is not provided.

SUMMARY

In recent years, the need for a medical diagnosis outside of hospitals, such as disaster medical care and home medical care, has been increasing. In response to this, a portable modality, such as a portable radiography device, has been developed. Even in such a field, there is a demand for the use of the image diagnosis support device in order to promptly perform a medical diagnosis in the field.

However, in some fields such as disaster medical care or home medical care, a network, such as the Internet, may not be available for use, and it may be difficult to use the image diagnosis support device installed in a facility as described in JP2003-150714A from a remote location. Therefore, there is a demand for an image diagnosis support device that can be used in the field such as disaster medical care or home medical care.

An object of the technology of the present disclosure is to provide an image diagnosis support device that can be used in a field such as disaster medical care or home medical care.

In order to achieve the above object, an image diagnosis support device of the present disclosure comprises: a CAD processing unit that performs computer-aided diagnostic processing on a medical image; a communication unit that receives the medical image from an external device and transmits information including a result of the computer-aided diagnostic processing by the CAD processing unit to the external device; a power supply unit that supplies power from a battery to the CAD processing unit and the communication unit; and a housing that accommodates the CAD processing unit, the communication unit, and the power supply unit and is portable by a user.

It is preferable that a display that displays the medical image is not provided.

It is preferable that the housing does not include a user interface operated by the user to input information.

It is preferable that a first connection portion to which a wireless dongle for wireless communication with the external device is connected and a second connection portion to which a communication cable for wired communication with the external device is connected are further provided.

It is preferable that the communication unit detects that the first connection portion or the second connection portion is connected to the external device by monitoring a state of link-up with the external device through software control.

It is preferable that the communication unit detects that the first connection portion or the second connection portion is connected to the external device by monitoring a current flowing through a light emitting element provided in each of the first connection portion and the second connection portion.

It is preferable that the communication unit is connected to one external device through software control in a case in which connection requests have been received from a plurality of the external devices.

It is preferable that the communication unit is connected to the one external device specified on the basis of an IP address of the external device or an access key transmitted from the external device.

It is preferable that the medical image is a radiation image.

According to the technology of the present disclosure, it is possible to provide an image diagnosis support device that can be used in a field such as disaster medical care or home medical care.

BRIEF DESCRIPTION OF THE DRAWINGS

Exemplary embodiments according to the technique of the present disclosure will be described in detail based on the following figures, wherein.

DETAILED DESCRIPTION

Figure 1:
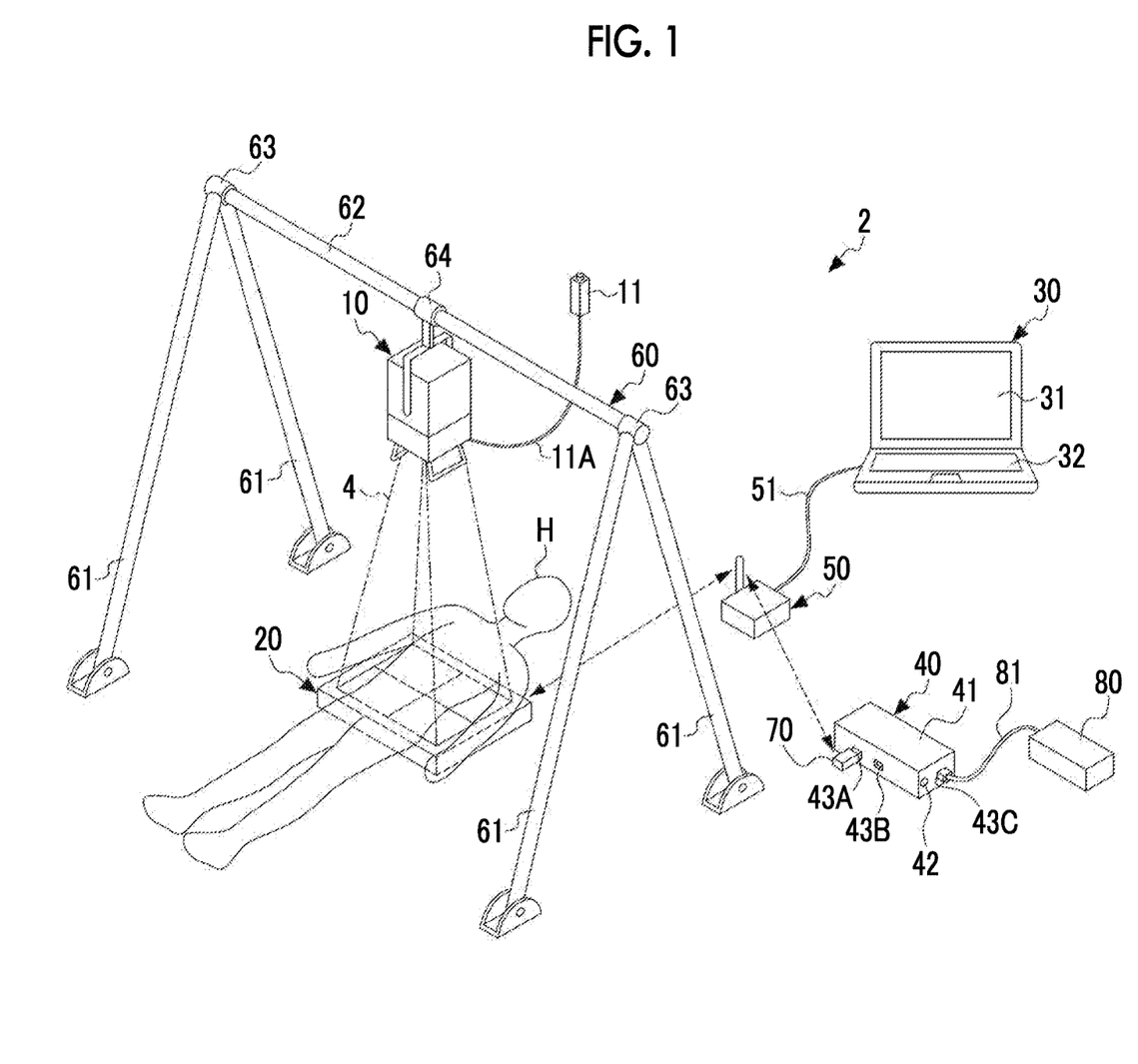
FIG. 1 is a diagram showing an example of a configuration of an X-ray imaging system.

FIG. 1 shows an example of a configuration of an X-ray imaging system 2 that uses an X-ray as radiation. The X-ray imaging system 2 that uses an X-ray as radiation comprises an X-ray source 10, an electronic cassette 20, a console 30, an image diagnosis support device 40, and a repeater 50. The console 30 communicates with the electronic cassette 20 and the image diagnosis support device 40 via the repeater 50. The repeater 50 functions as, for example, an access point.

The X-ray source 10 is an example of a radiation source that generates radiation. The electronic cassette 20 is an example of a radiation image detector that detects radiation and that generates a radiation image. The image diagnosis support device 40 performs CAD processing of detecting a region including an abnormal shadow from a radiation image.

The X-ray source 10, the electronic cassette 20, the console 30, and the image diagnosis support device 40 of the present embodiment are all compact and portable devices that can be carried. In the X-ray imaging system 2, these can be carried to a field where emergency medical response such as an accident or a disaster is required or a home of a patient who receives home medical care to perform X-ray imaging. With such a portable X-ray imaging system 2, the captured X-ray image can be immediately confirmed on the field, and re-imaging accompanied by a revisit at a later date can be prevented. The X-ray image is an example of a "medical image" according to the technology of the present disclosure.

In the X-ray imaging system 2, the electronic cassette 20 is disposed at a position facing the X-ray source 10. By disposing a subject H between the X-ray source 10 and the electronic cassette 20, it is possible to perform X-ray imaging of an examination site (for example, the chest part) of the subject H.

The X-ray source 10 is held by, for example, a holding device 60. The holding device 60 is, for example, a quadruped having four support legs 61 and a horizontal bar 62. The upper ends of the support legs 61 and both ends of the horizontal bar 62 are each connected to a three-pronged joint 63, whereby the holding device 60 is assembled. The horizontal bar 62 is provided with an attachment bracket 64 for mechanically attaching the X-ray source 10. The X-ray source 10 is suspended by the attachment bracket 64 such that the irradiation direction of an X-ray 4 is directed downward.

An irradiation switch 11 is connected to the X-ray source 10 via a cable 11A. A user such as a radiologist or a doctor who uses the X-ray imaging system 2 can operate the irradiation switch 11 to cause the X-ray source 10 to start irradiation of the X-ray 4.

The electronic cassette 20 has an automatic X-ray detection function of detecting the start of irradiation of the X-ray 4 emitted from the X-ray source 10. Therefore, the electronic cassette 20 does not need to be connected to the X-ray source 10. Further, since the electronic cassette 20 includes a built-in battery and has a wireless communication function, it is not necessary to connect the electronic cassette 20 to the power source or the console 30 via a cable. The electronic cassette 20 is wirelessly connected to the repeater 50 and communicates with the console 30 via the repeater 50.

The console 30 is composed of, for example, a personal computer and includes a display unit 31 and an input operation unit 32. The console 30 is connected to the repeater 50 via, for example, a communication cable 51. The display unit 31 is a display device such as a liquid crystal display or an organic electro luminescence (EL) display. The input operation unit 32 is an input device including a keyboard, a mouse, a touch pad, or the like.

The user can input patient information, imaging conditions, and the like by operating the input operation unit 32. The display unit 31 displays an X-ray image received by the console 30 from the X-ray source 10. In a case in which the user observes the X-ray image and determines that the CAD processing is necessary, the user can input an execution request of the CAD processing using the input operation unit 32.

The console 30 communicates with the image diagnosis support device 40 via the repeater 50. The console 30 transmits a CAD processing request to the image diagnosis support device 40 in response to an operation signal input by the user via the input operation unit 32. At this time, the console 30 transmits the X-ray image to the image diagnosis support device 40 together with the CAD processing request. In a case in which the console 30 receives the CAD processing result from the image diagnosis support device 40, the console 30 causes the display unit 31 to display an X-ray image in which the CAD processing result is reflected.

The image diagnosis support device 40 includes a housing 41 having a size portable by the user. The housing 41 is, for example, a box-shaped case having a length, a width, and a height each of which is 20 cm or less. The housing 41 is provided with a power switch 42, a first connector 43A, a second connector 43B, and a third connector 43C. For example, the first connector 43A is a terminal having a universal serial bus (USB) type A interface (hereinafter, referred to as a USB-A I/F). The second connector 43B is a terminal having a local area network (LAN) interface (hereinafter, referred to as a LAN I/F). The third connector 43C is a terminal having a USB type C interface (hereinafter, referred to as a USB-C I/F). The first connector 43A is an example of a "first connection portion" according to the technology of the present disclosure. The second connector 43B is an example of a "second connection portion" according to the technology of the present disclosure.

The housing 41 does not comprise a display that displays an X-ray image. In addition, the housing 41 does not comprise a user interface operated by the user to input information. The user interface is, for example, a physical operation button or a touch panel. As described above, since the housing 41 does not comprise the display and the user interface, miniaturization is possible as described above. The housing 41 may include a connector for connecting a display as an external device (for example, an High-Definition Multimedia Interface (HDMI (registered trademark)) terminal and a connector for connecting a keyboard or the like as an external device (for example, a USB terminal).

The image diagnosis support device 40 is connected to the repeater 50 in a wireless or wired manner. For example, by connecting a wireless dongle 70 to the first connector 43A, the image diagnosis support device 40 is wirelessly connected to the repeater 50. The wireless dongle 70 is, for example, a WiFi_USB adapter that enables communication by WiFi. In a case in which the wireless dongle 70 is connected to the first connector 43A, the image diagnosis support device 40 communicates with the console 30 via the repeater 50. The console 30 is an example of an "external device" according to the technology of the present disclosure.

In addition, the second connector 43B is used in a case in which the image diagnosis support device 40 and the repeater 50 are connected in a wired manner via a LAN cable (not shown). In a case in which the LAN cable is connected between the second connector 43B and the repeater 50, the image diagnosis support device 40 communicates with the console 30 via the repeater 50. The LAN cable is an example of a "communication cable" according to the technology of the present disclosure.

The third connector 43C corresponds to a power supply standard of USB_PD (power delivery). A mobile battery 80 can be connected to the third connector 43C via a USB cable 81 corresponding to USB_PD. The mobile battery 80 can supply power to the inside of the image diagnosis support device 40 and the built-in battery built in the image diagnosis support device 40. The mobile battery 80 supplies DC power to the image diagnosis support device 40. The mobile battery 80 is an example of a "battery" according to the technology of the present disclosure.

In addition, the third connector 43C can also be connected to an alternating current (AC) adapter (not shown) instead of the mobile battery 80. The third connector 43C can be connected to the AC adapter via the USB cable 81, and the AC adapter can also be connected to a commercial AC power source of a general household or the like. As a result, the image diagnosis support device 40 can receive the supply of power converted into DC by the AC adapter from the commercial AC power source.

Figure 2:
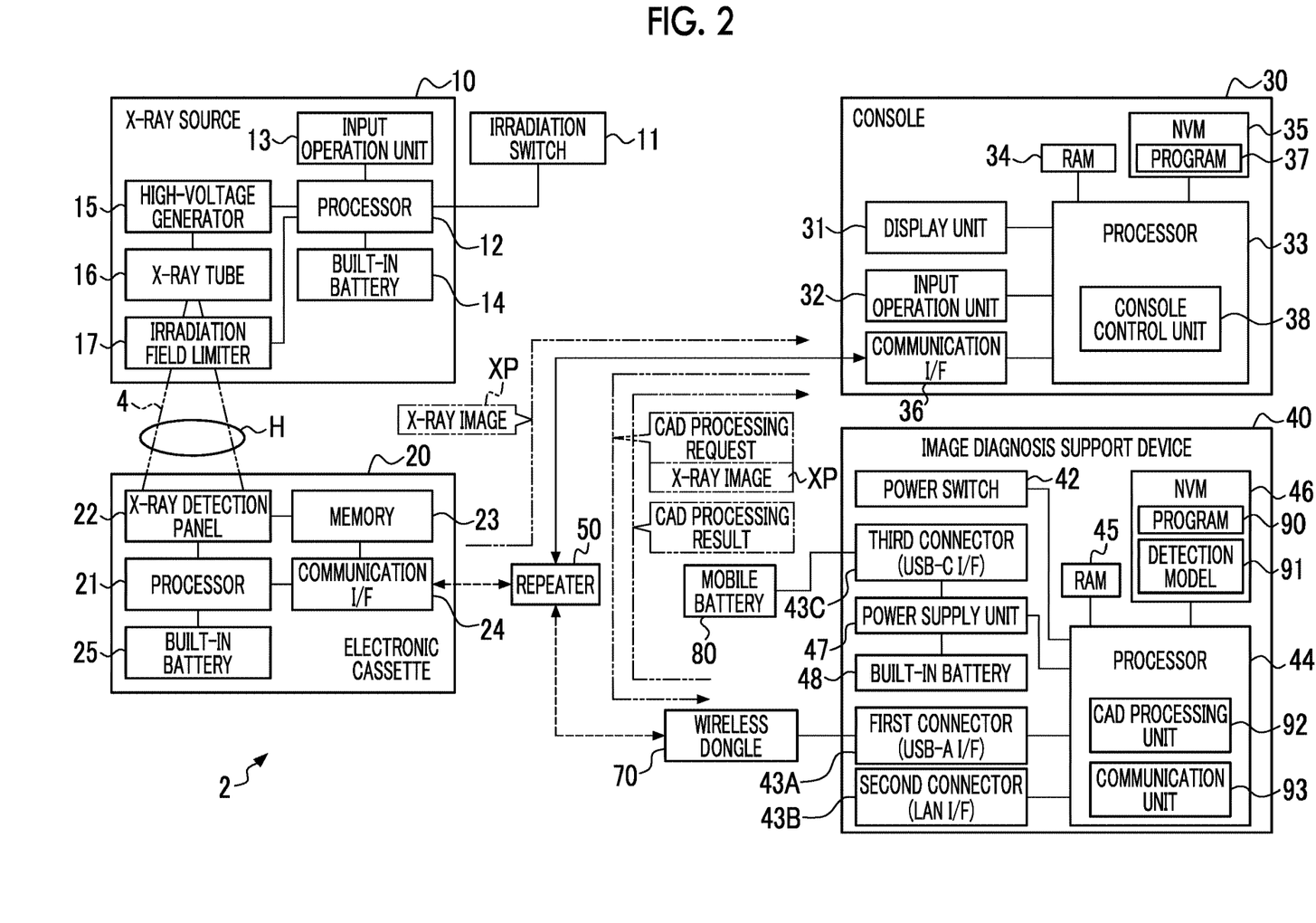
FIG. 2 is a block diagram showing an example of a hardware configuration of the X-ray imaging system.

FIG. 2 shows an example of a hardware configuration of the X-ray imaging system 2. The X-ray source 10 comprises a processor 12, an input operation unit 13, a built-in battery 14, a high-voltage generator 15, an X-ray tube 16, and an irradiation field limiter 17. The processor 12 functions as a control unit that controls the operations of the high-voltage generator 15 and the irradiation field limiter 17. The irradiation switch 11 described above is connected to the processor 12. In addition, the input operation unit 13 is connected. The input operation unit 13 includes an imaging condition adjustment button for setting a tube voltage and a tube current of the X-ray tube 16, an irradiation field button for adjusting the size of the irradiation field of the irradiation field limiter 17, a power button, and the like.

The processor 12 controls the high-voltage generator 15 and the irradiation field limiter 17 on the basis of the setting conditions set via the input operation unit 13. The processor 12 causes the high-voltage generator 15 to generate a high voltage in response to the operation of the irradiation switch 11. The built-in battery 14 is a secondary battery such as a lithium polymer battery and can be charged via a connector (not shown).

The X-ray tube 16 is a fixed anode type X-ray tube that does not include a rotation mechanism of a target. The X-ray tube 16 is composed of a cold cathode electron source that emits electrons, an electron accelerator, a target that generates the X-ray 4 by colliding electrons, and an exterior tube that accommodates these. The cold cathode electron source does not require a filament and a heater for heating the filament, as in a case of a hot cathode. The X-ray tube 16 is compact and lightweight because the X-ray tube 16 does not include a rotation mechanism of the target and also does not include the filament and the heater. In addition, since the X-ray tube 16 does not require residual heat of the filament, it is possible to immediately generate the X-ray 4 in response to the irradiation start instruction.

The irradiation field limiter 17 limits the irradiation field of the X-ray 4 generated by the X-ray tube 16. In the X-ray 4 generated by the X-ray tube 16, the irradiation field is limited by the irradiation field limiter 17, and the examination site of the subject H is irradiated with the X-ray 4. The X-ray 4 transmitted through the examination site of the subject H is incident on the electronic cassette 20.

The electronic cassette 20 comprises a processor 21, an X-ray detection panel 22, a memory 23, a communication I/F 24, and a built-in battery 25. The processor 21 functions as a control unit that controls each unit in the electronic cassette 20. The X-ray detection panel 22 is, for example, a flat panel detector having a matrix substrate in which a plurality of pixels consisting of a thin film transistor (TFT) and an X-ray detection element are two-dimensionally arranged.

The X-ray detection panel 22 converts incident X-rays in a charge accumulation state in which the TFT is turned off into a charge by the X-ray detection element and accumulates the charge. Then, in the X-ray detection panel 22, the charge accumulated in the X-ray detection element is read out to the signal processing circuit in a charge read-out state in which the TFT is turned on. In the signal processing circuit, the read-out charge is converted into a voltage signal by an integrating amplifier, and the converted voltage signal is subjected to A/D conversion by an A/D converter, so that digital image data is generated. Hereinafter, this image data will be referred to as an X-ray image XP.

The memory 23 is a non-volatile memory such as a flash memory and stores the X-ray image XP generated by the X-ray detection panel 22. The communication I/F 24 is wirelessly connected to the repeater 50. The processor 21 transmits the X-ray image XP stored in the memory 23 to the console 30 via the repeater 50. The electronic cassette 20 can also be connected to the repeater 50 in a wired manner via a communication cable.

The built-in battery 25 is a secondary battery such as a lithium polymer battery and can be charged via a connector (not shown).

The console 30 comprises the display unit 31, the input operation unit 32, a processor 33, a random access memory (RAM) 34, a non-volatile memory (NVM) 35, and a communication I/F 36. The processor 33 is, for example, a central processing unit (CPU). The RAM 34 is a work memory for the processor 33 to execute processing. The NVM 35 is a storage device such as a flash memory and stores a program 37.

The processor 33 loads the program 37 stored in the NVM 35 into the RAM 34 and executes processing in accordance with the program 37, thereby functioning as a console control unit 38 that collectively controls each unit of the console 30. The console control unit 38 displays a graphical user interface (GUI) screen on the display unit 31 thereby enabling the input of patient information, imaging conditions, and the like using the input operation unit 32. In addition, the console control unit 38 causes the display unit 31 to display the X-ray image XP received from the electronic cassette 20. The doctor can perform a diagnosis on the basis of the X-ray image XP displayed on the display unit 31, but it is possible to input an execution request of the CAD processing by using the input operation unit 32 in order to narrow down candidates for abnormal shadows including lesions and the like from the X-ray image XP.

The communication I/F 36 is connected to the repeater 50 in a wired manner via the communication cable 51 (see FIG. 1). The console control unit 38 transmits the X-ray image XP to the image diagnosis support device 40 together with the CAD processing request via the communication I/F 36. It is also possible to wirelessly connect the console 30 to the repeater 50. Further, the console 30 may be, for example, a mobile terminal such as a tablet terminal or a smartphone, in addition to a laptop computer equipped with a battery.

The image diagnosis support device 40 comprises, in addition to the power switch 42, the first connector 43A, the second connector 43B, and the third connector 43C described above, a processor 44, a RAM 45, an NVM 46, a power supply unit 47, and a built-in battery 48 inside the housing 41. The processor 44 is composed of, for example, a CPU and a graphics processing unit (GPU). The RAM 45 is a work memory for the processor 44 to execute processing. The NVM 46 is a storage device such as a flash memory and stores a program 90 and a detection model 91. The NVM 46 also stores data such as the X-ray image XP transmitted from the console 30.

The processor 44 loads the program 90 stored in the NVM 46 into the RAM 45 and executes processing in accordance with the program 90, thereby functioning as a CAD processing unit 92 and a communication unit 93. The CAD processing unit 92 performs CAD processing on the X-ray image XP using the detection model 91 stored in the NVM 46. The detection model 91 is a trained model that has been trained by machine learning.

The detection model 91 is configured using a neural network. The detection model 91 is configured using, for example, a deep neural network (DNN), which is a multi-layer neural network that is a target of deep learning. As the DNN, for example, a convolutional neural network (CNN) targeting images is used.

The communication unit 93 controls communication performed with the console 30 via the first connector 43A or the second connector 43B.

The power supply unit 47 is a power supply circuit that supplies power supplied from the mobile battery 80 via the third connector 43C to the processor 44 and the like. The power supply unit 47 includes, for example, a power circuit and a charge control circuit. The power circuit regulates the power supplied from the mobile battery 80 and supplies the power to the processor 44 and the like. The charge control circuit controls charging of the built-in battery 48 with the power supplied from the mobile battery 80. The built-in battery 48 is a secondary battery such as a lithium polymer battery.

Figure 3:
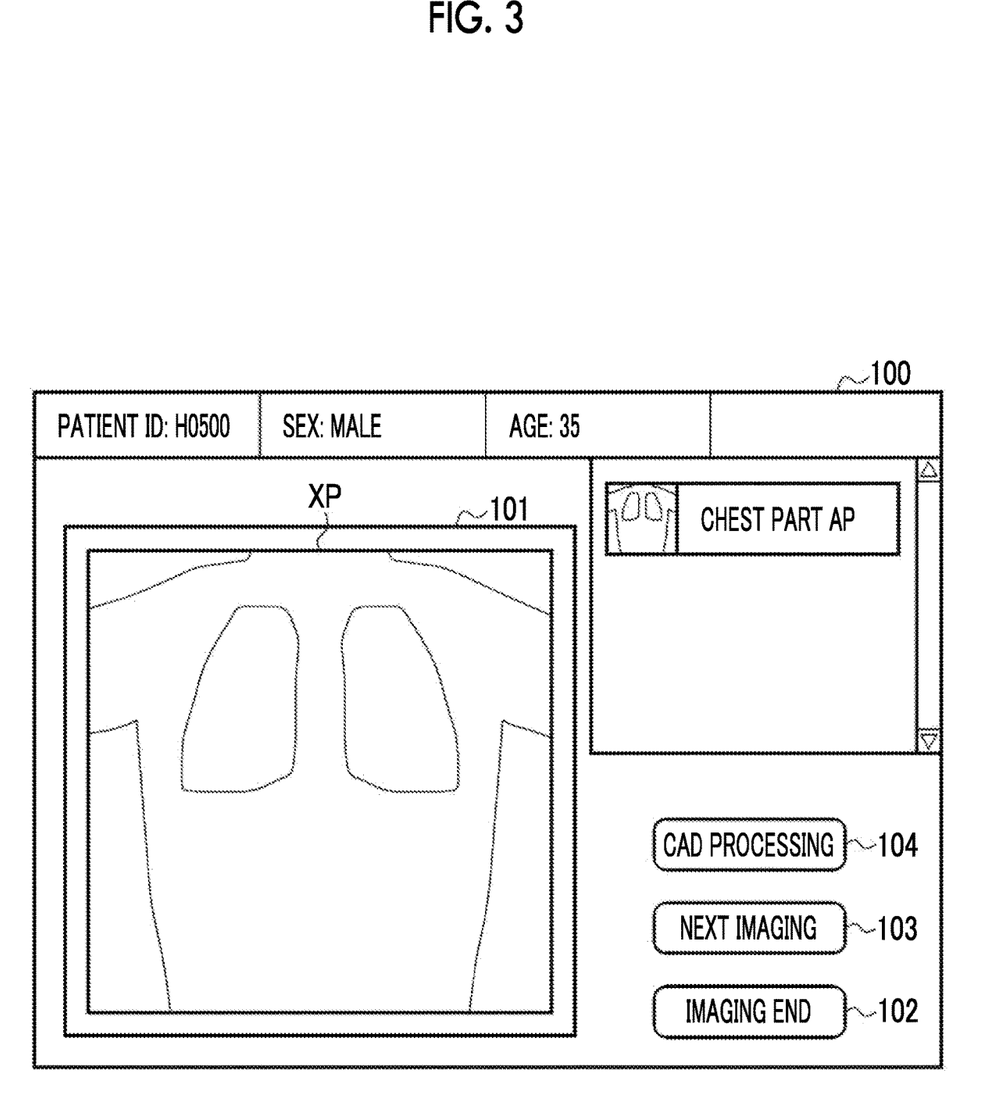
FIG. 3 is a diagram showing an example of a console screen.

FIG. 3 shows an example of a console screen displayed on the display unit 31 of the console 30 by the console control unit 38. After X-ray imaging is performed by the X-ray source 10 and the electronic cassette 20 and the console 30 receives the X-ray image from the electronic cassette 20, a console screen 100 shown in FIG. 3 is displayed on the display unit 31. The console screen 100 is provided with an image display region 101 for displaying the X-ray image XP.

Further, an imaging end button 102 for completing imaging, a next imaging button 103 for performing the next imaging, and a CAD processing button 104 for making a CAD processing request are displayed on the console screen 100. In a case of making the CAD processing request, the doctor or the like presses the CAD processing button 104 by operating, for example, a mouse as the input operation unit 32.

Figure 4:
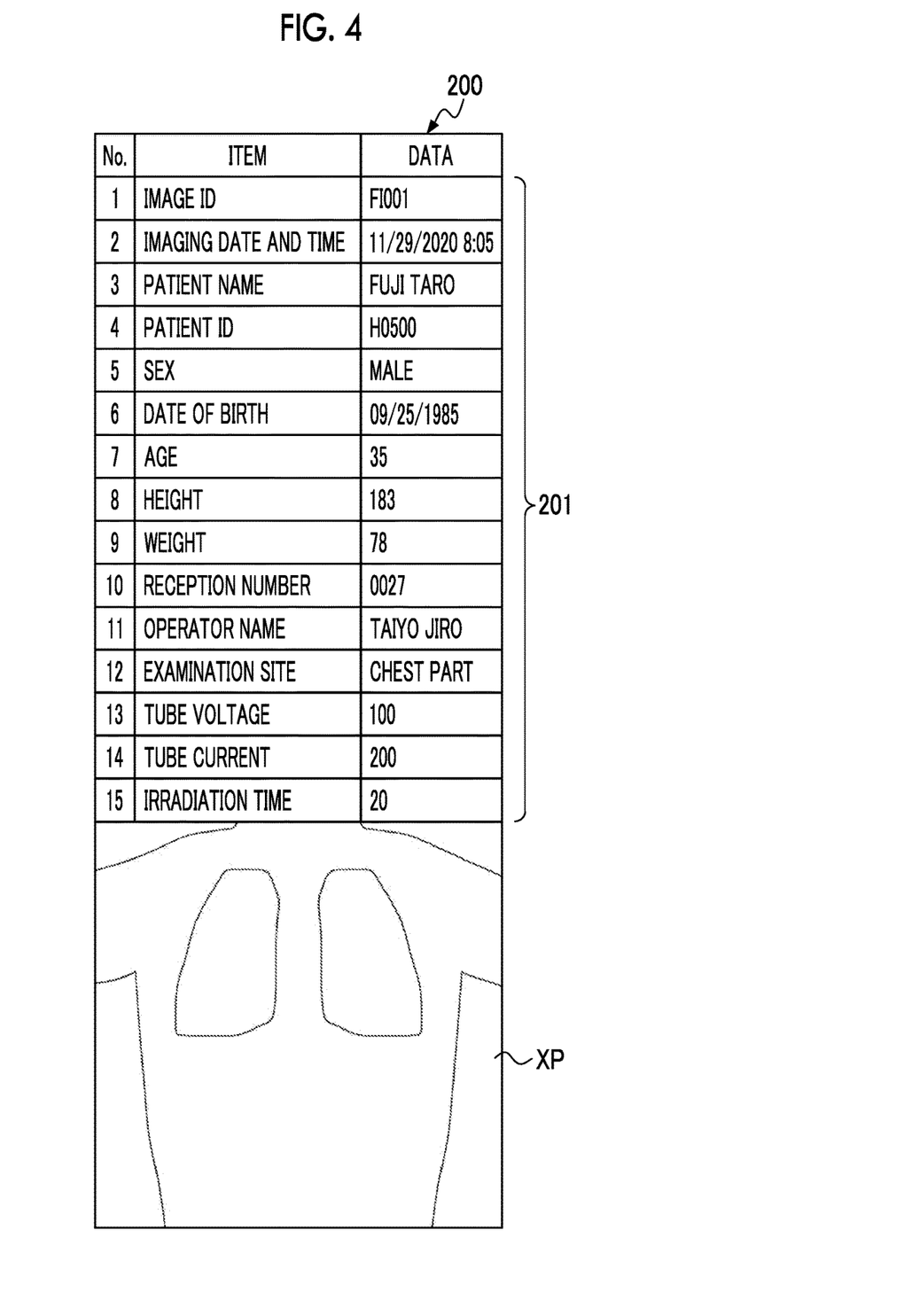
FIG. 4 is a diagram showing an example of a file format of an image file.

In addition, in a case in which the imaging end button 102 is pressed to end imaging, the console control unit 38 stores the X-ray image XP, for example, as an image file 200 in a format conforming to a digital imaging and communication in medicine (DICOM) standard as shown in FIG. 4 in the NVM 46. The image file 200 is a file in which the X-ray image XP and accessory information 201 are associated with one image ID. The accessory information 201 includes patient information, a reception number, an examination site, imaging conditions, and the like.

The technology of the present disclosure is not limited to the X-ray image XP, and the console control unit 38 may transmit the image file 200 to the image diagnosis support device 40 together with the CAD processing request.

Figure 5:
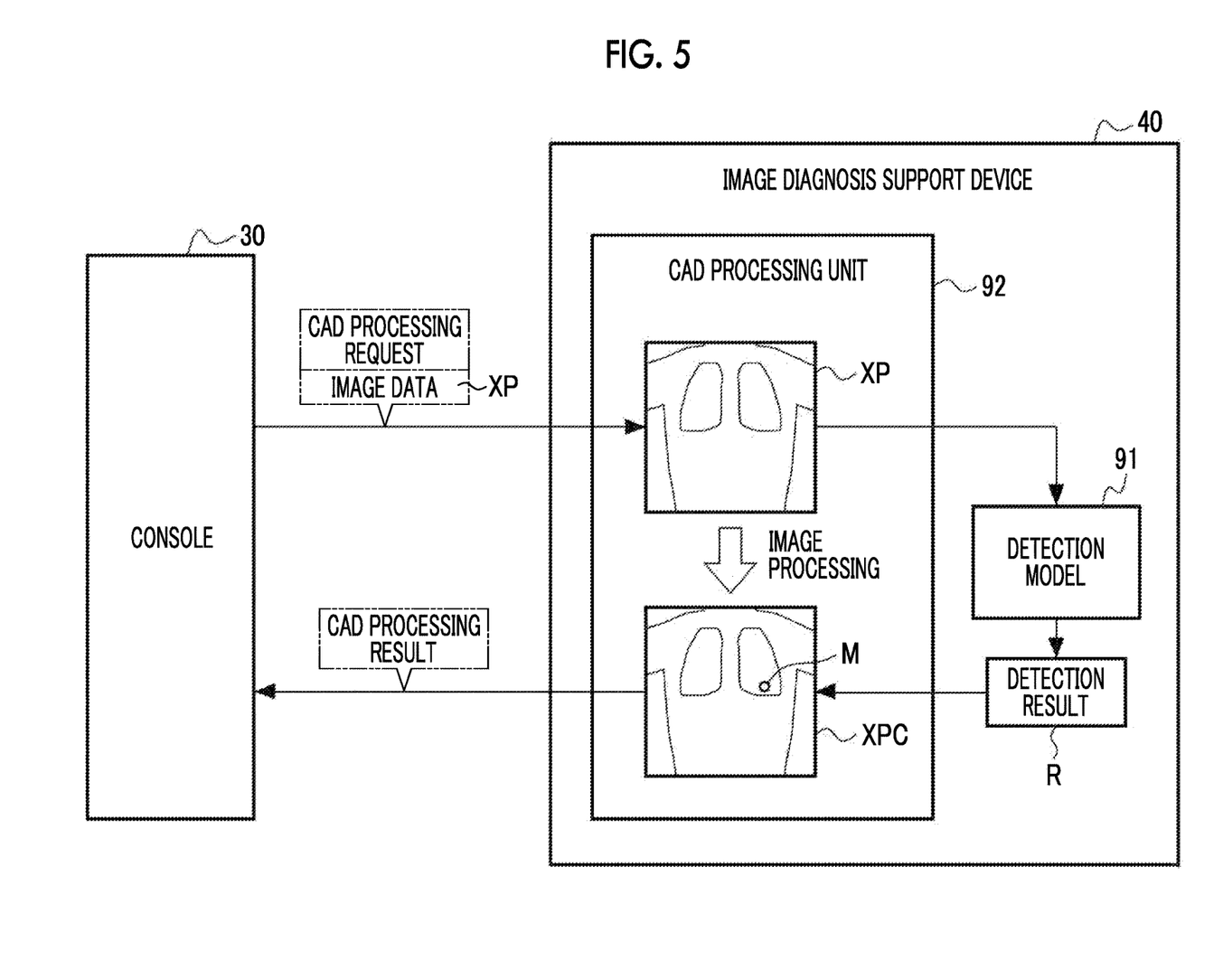
FIG. 5 is a diagram conceptually showing an example of CAD processing.

FIG. 5 conceptually shows an example of CAD processing executed by the image diagnosis support device 40. In a case in which the image diagnosis support device 40 receives the X-ray image XP from the console 30 together with the CAD processing request, the CAD processing unit 92 inputs the X-ray image XP to the detection model 91. The detection model 91 detects a region including an abnormal shadow from the input X-ray image XP and outputs a detection result R. The detection result R includes position information of the region including the abnormal shadow in the X-ray image XP.

The CAD processing unit 92 generates a processed X-ray image XPC by performing image processing on the X-ray image XP on the basis of the detection result R. For example, the CAD processing unit 92 generates the processed X-ray image XPC by superimposing a circular mark M surrounding the abnormal shadow on the X-ray image XP, on the basis of the detection result R. The CAD processing unit 92 transmits the processed X-ray image XPC to the console 30 as a CAD processing result.

The CAD processing unit 92 may transmit only information indicating the detection result R as the CAD processing result to the console 30. In this case, image processing need only be performed on the X-ray image XP in the console 30 on the basis of the detection result R.

Figure 6:
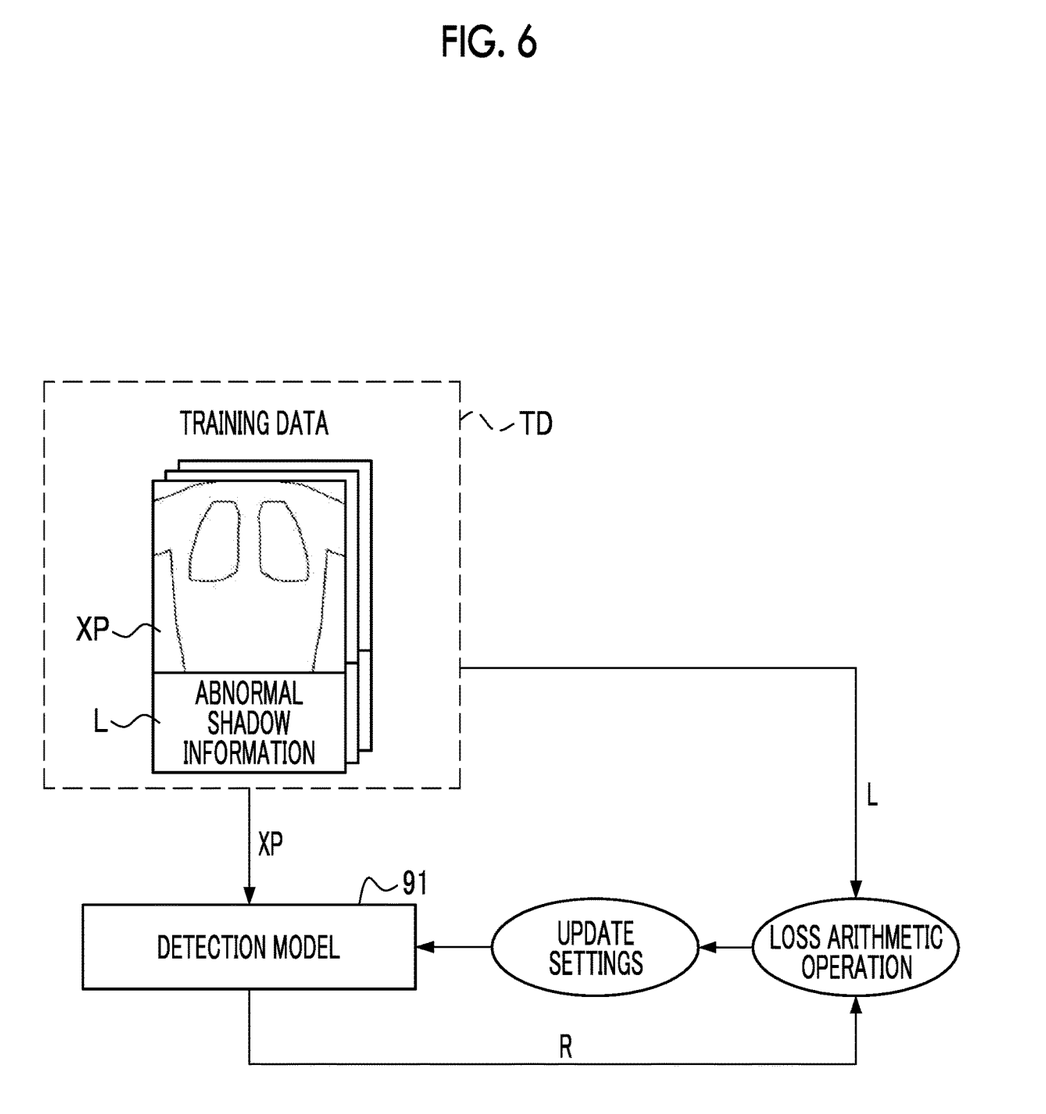
FIG. 6 is a diagram illustrating an example of a learning phase in which a detection model is trained by machine learning.

FIG. 6 illustrates an example of a learning phase in which the detection model 91 is trained by machine learning. The detection model 91 is trained using training data TD. The training data TD includes the X-ray image XP as a plurality of training images labeled with ground truth labels L. The X-ray image XP included in the training data TD is a sample image including various abnormal shadows. The ground truth label L is, for example, position information of an abnormal shadow in the X-ray image XP.

In the learning phase, the X-ray image XP as the training image is input to the detection model 91. The detection model 91 outputs the detection result R based on the input X-ray image XP. A loss arithmetic operation using a loss function is performed on the basis of the detection result R and the ground truth label L. Then, update settings for various coefficients (weight coefficients, biases, and the like) of the detection model 91 are performed on the basis of the result of the loss arithmetic operation, and the detection model 91 is updated in accordance with the update settings.

In the learning phase, a series of processing of inputting the training image to the detection model 91, outputting the detection result R from the detection model 91, performing the loss arithmetic operation, performing the update settings, and updating the detection model 91 are repeatedly performed. The repetition of this series of processing ends in a case in which the detection accuracy has reached a predetermined setting level. The detection model 91 in which the detection accuracy has reached the setting level is stored in the NVM 46 and then used by the CAD processing unit 92 in the CAD processing which is an operation phase (also referred to as an inference phase).

The learning phase is executed, for example, in another computer different from the image diagnosis support device 40. The detection model 91 generated by the other computer is transmitted to the image diagnosis support device 40 and stored in the NVM 46. The learning phase may be executed in the image diagnosis support device 40.

In addition, in the learning phase, the detection model 91 may be generated for each examination site (the chest part, the abdominal part, or the like). That is, the NVM 46 may store a plurality of the detection models 91 generated for each examination site. In this case, the CAD processing unit 92 need only select the detection model 91 corresponding to the examination site by referring to the examination site included in the accessory information 201 (see FIG. 4) of the X-ray image XP as a target of the CAD processing.

Figure 7:
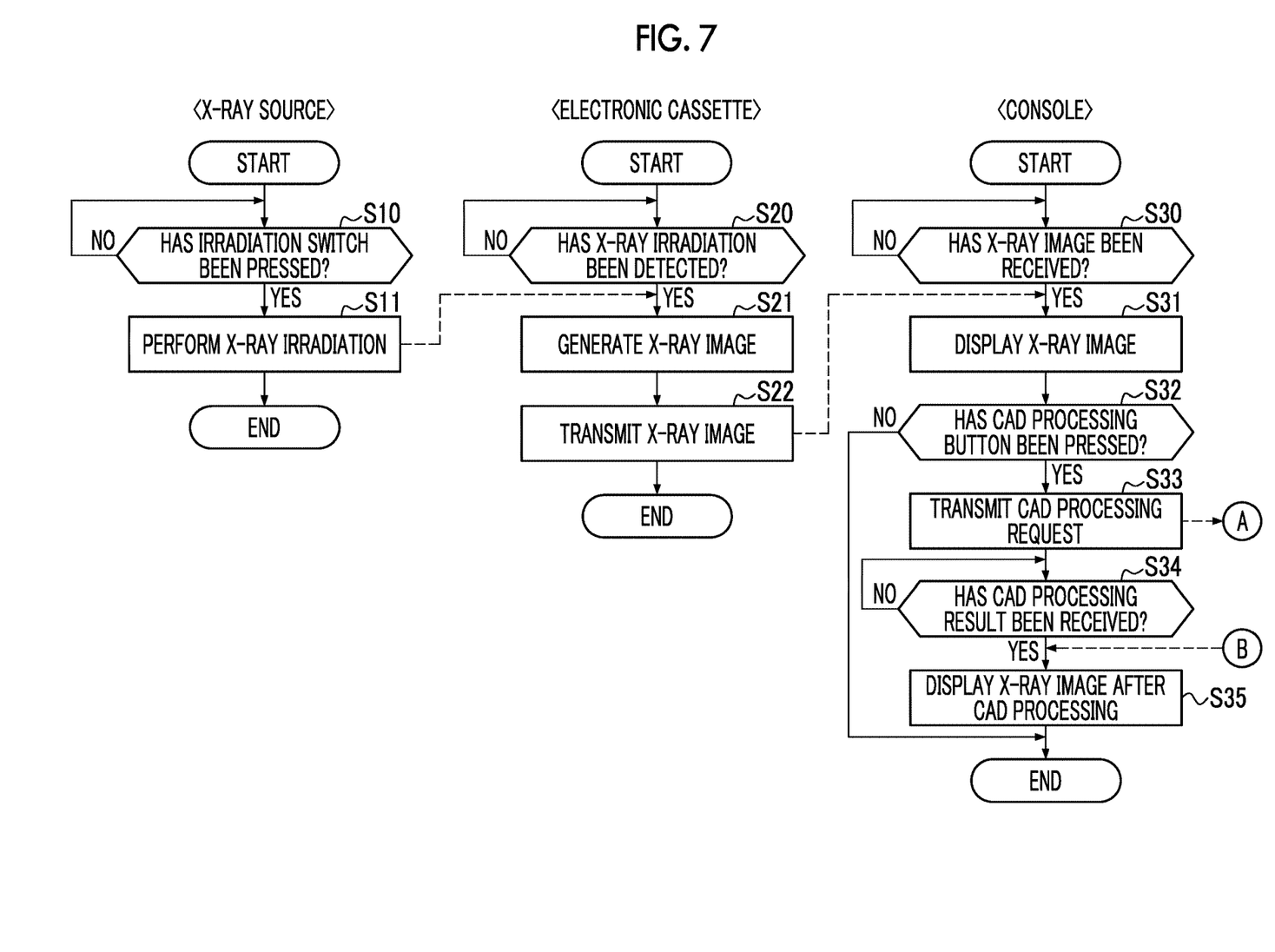
FIG. 7 is a flowchart showing an example of a processing flow of an X-ray source, an electronic cassette, and a console.
Figure 8:
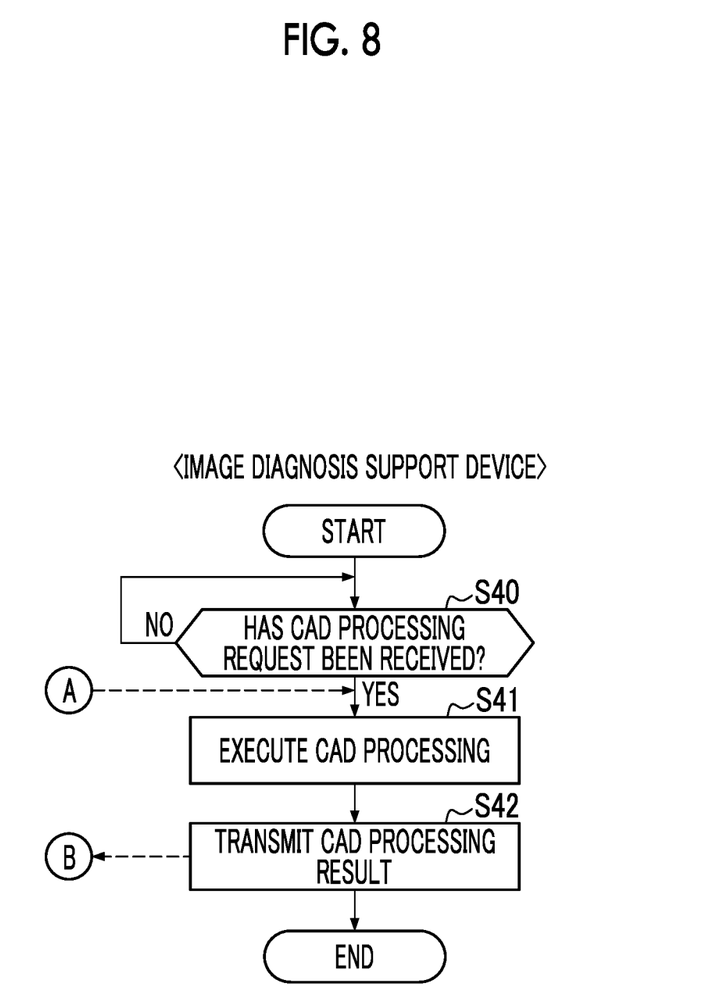
FIG. 8 is a flowchart showing an example of a processing flow of an image diagnosis support device.

Next, the operation of the X-ray imaging system 2 having the above configuration will be described with reference to the flowcharts shown in FIGS. 7 and 8. FIG. 7 shows an example of a processing flow of the X-ray source 10, the electronic cassette 20, and the console 30. FIG. 8 shows an example of a processing flow of the image diagnosis support device 40.

Prior to imaging, the user such as the doctor performs an operation to input imaging conditions, patient information, and the like to the X-ray source 10 and the console 30. Next, the subject H is disposed between the X-ray source 10 and the electronic cassette 20. When the imaging preparation is completed, the user operates the irradiation switch 11 to start the irradiation of the X-ray source 10 with the X-ray 4.

The processor 12 of the X-ray source 10 determines whether or not the irradiation switch 11 has been pressed by the user (step S10). In a case in which the processor 12 determines that the irradiation switch 11 has been pressed (step S10: YES), the processor 12 causes the high-voltage generator 15 to generate a high voltage to generate the X-ray 4 in the X-ray tube 16 (step S11). With this, the X-ray 4 is emitted from the X-ray source 10 to the electronic cassette 20 via the subject H.

The processor 21 of the electronic cassette 20 determines whether or not the X-ray irradiation has been detected by the automatic X-ray detection function (step S20). In a case in which the processor 21 determines that the X-ray irradiation has been detected (step S20: YES), the processor 21 causes the X-ray detection panel 22 to generate the X-ray image XP (step S21). Then, the processor 21 transmits the X-ray image XP to the console 30 via the communication I/F 24 (step S22).

The console control unit 38 of the console 30 determines whether or not the X-ray image XP has been received from the electronic cassette 20 (step S30). In a case in which the console control unit 38 determines that the X-ray image XP has been received (step S30: YES), the console control unit 38 displays the X-ray image XP on the console screen 100 (see FIG. 3) (step S31). Next, the console control unit 38 determines whether or not the CAD processing button 104 has been pressed by the user (step S32). In a case in which the console control unit 38 determines that the CAD processing button 104 has not been pressed (step S32: NO), the console control unit 38 ends the processing.

On the other hand, in a case in which the console control unit 38 determines that the CAD processing button 104 has been pressed (step S32: YES), the console control unit 38 transmits the X-ray image XP to the image diagnosis support device 40 together with the CAD processing request (step S33). Then, the console control unit 38 determines whether or not the CAD processing result has been received from the image diagnosis support device 40 (step S34). In a case in which the console control unit 38 determines that the CAD processing result has been received from the image diagnosis support device 40 (step S34: YES), the console control unit 38 displays the processed X-ray image XPC (see FIG. 5) received as the CAD processing result from the image diagnosis support device 40 on the console screen 100 (step S35).

As shown in FIG. 8, in the image diagnosis support device 40, the communication unit 93 determines whether or not the CAD processing request has been received from the console 30 (step S40). In a case in which the communication unit 93 determines that the CAD processing request has been received (step S40: YES), the communication unit 93 causes the CAD processing unit 92 to execute the CAD processing on the X-ray image XP received together with the CAD processing request (step S41). The CAD processing unit 92 generates the processed X-ray image XPC by executing the CAD processing using the detection model 91 (see FIG. 5). Then, the communication unit 93 transmits the processed X-ray image XPC as the CAD processing result to the console 30 (step S42).

With that, the processing of the X-ray imaging system 2 ends. As described above, since the X-ray imaging system 2 comprises the image diagnosis support device 40 that is portable by the user and can be powered by the mobile battery 80, it is possible to provide an image diagnosis support device that can be used in the field of disaster medical care or home medical care.

Modification Example

Next, various modification examples of the X-ray imaging system 2 according to the above embodiment will be described.

In order to miniature the image diagnosis support device 40, it is not preferable to incorporate large-scale hardware to detect the electrical connection of the external device to the first connector 43A or the second connector 43B. Therefore, in the present modification example, the communication unit 93 detects that the external device is connected to the first connector 43A or the second connector 43B by monitoring a state of link-up with the external device through software control.

The communication unit 93 communicates with the console 30 as the external device using, for example, transmission control protocol/Internet protocol (TCP/IP). Link-up means that a certain communication device is in a "communicable state" with another communication device in a wireless or wired manner. The "communicable state" indicates, for example, a state in which communication is possible at the data link layer (that is, layer 2) in an open systems interconnection (OSI) reference model, that is, a state in which two communication devices can electrically communicate with each other.

Figure 9:
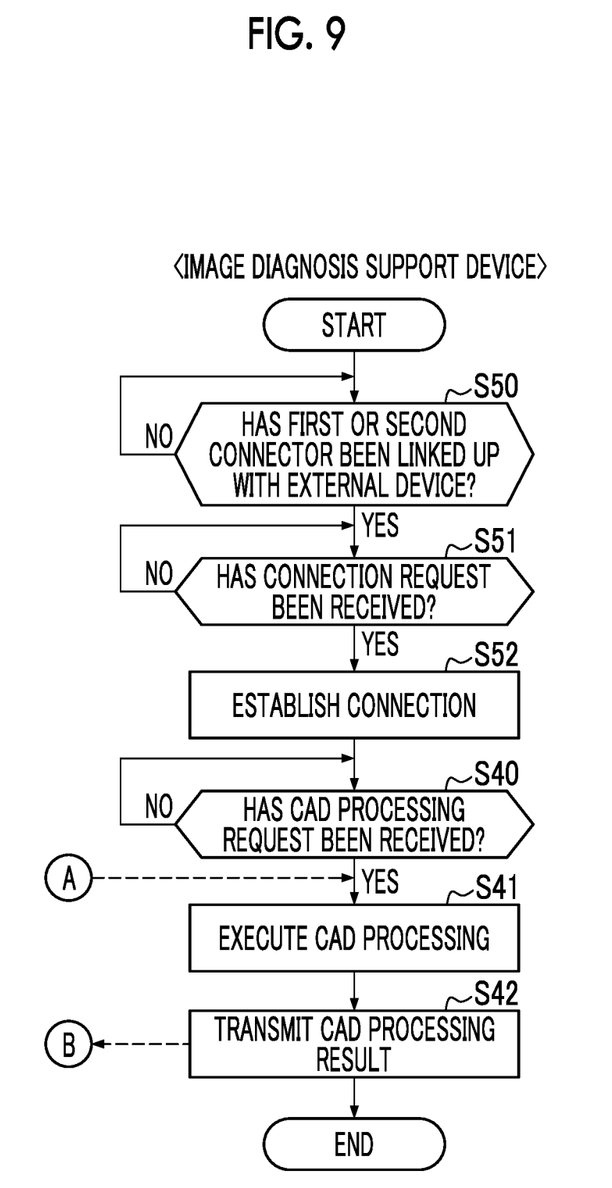
FIG. 9 is a flowchart showing a processing flow of an image diagnosis support device according to a modification example.

FIG. 9 shows a processing flow of the image diagnosis support device 40 according to the present modification example. The flowchart shown in FIG. 9 is obtained by adding steps S50 to S52 to the flowchart shown in FIG. 8. First, the communication unit 93 determines whether or not the first connector 43A or the second connector 43B has been linked up with the external device through software control (step S50). In a case in which the communication unit 93 determines that the first connector 43A or the second connector 43B has been linked up with the external device (step S50: YES), the communication unit 93 determines whether or not the connection request has been received from the external device at the application layer level (step S51). In a case in which the connection request has been received from the external device (step S51: YES), the communication unit 93 establishes the connection to the external device (step S52).

Next, the communication unit 93 determines, at the application layer level, whether or not the CAD processing request has been received from the console 30 as the external device (step S40). Subsequent processing is the same as that of the above embodiment.

In addition, instead of monitoring the state of link-up with the external device through software control, the communication unit 93 can detect the electrical connection of the external device to the first connector 43A or the second connector 43B by using simple hardware.

Figure 10:
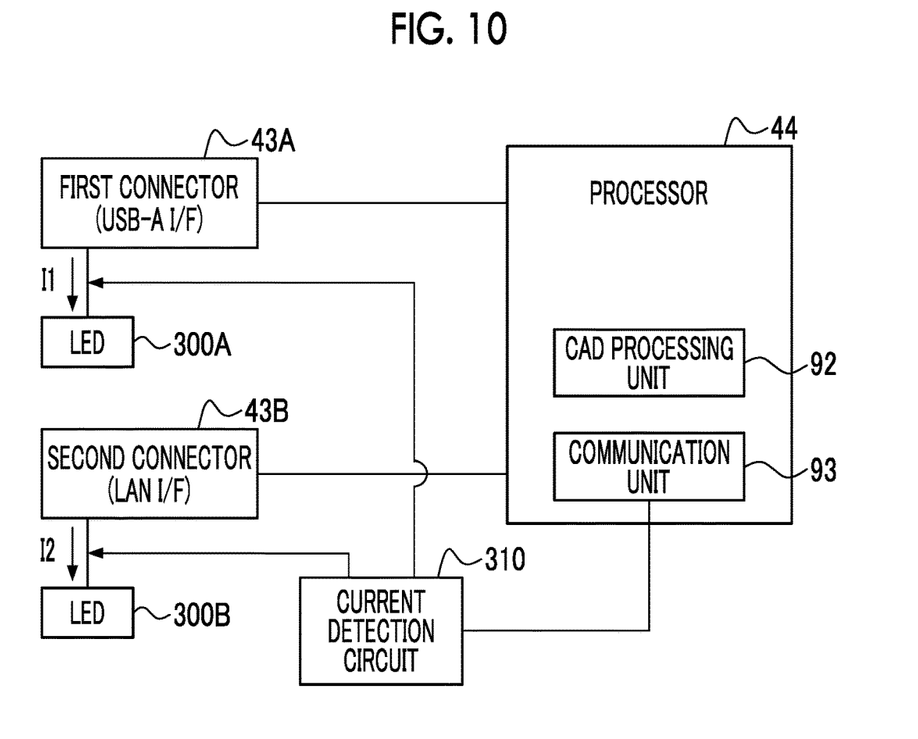
FIG. 10 is a diagram showing an example of a connection detection method using simple hardware.

For example, as shown in FIG. 10, in a case in which a light emitting diode (LED) 300A is connected to the first connector 43A and an LED 300B is connected to the second connector 43B, a current detection circuit 310 is provided as simple hardware. The LED 300A and the LED 300B are light emitting elements that indicate to the user the states of link-up of the first connector 43A and the second connector 43B, respectively.

The current detection circuit 310 detects a current I1 flowing through the LED 300A when the LED 300A emits light and a current I2 flowing through the LED 300B when the LED 300B emits light. The communication unit 93 detects the electrical connection of the external device to the first connector 43A or the second connector 43B by monitoring the current I1 and the current I2 detected by the current detection circuit 310.

In addition, the image diagnosis support device 40 may be connected to a plurality of external devices at the same time in a case in which connection requests have been received from the plurality of external devices by the web application programming interface (WebAPI). It is preferable that the image diagnosis support device 40 is configured to be connected to only one external device through software control in a case in which connection requests have been received from the plurality of external devices.

Figure 11:
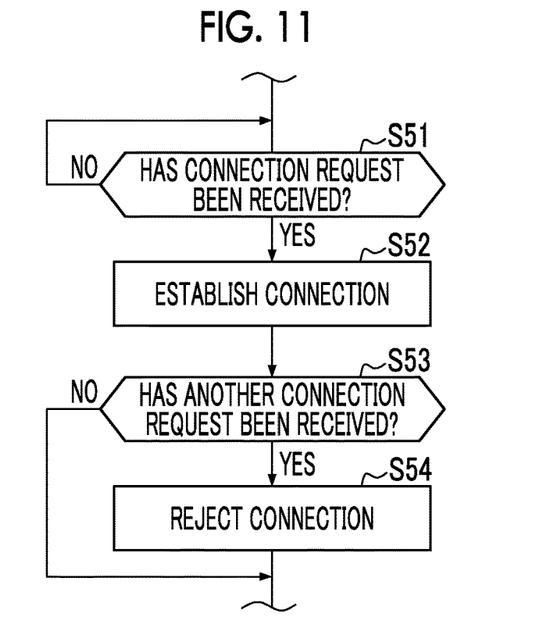
FIG. 11 is a flowchart showing a modification example of connection processing.

FIG. 11 is a modification example of the flowchart shown in FIG. 9 and shows only a part of the connection processing to the external device. As shown in FIG. 11, in step S51, in a case in which a connection request has been received from an external device by WebAPI (step S51: YES), the communication unit 93 establishes the connection to the external device (step S52). Next, the communication unit 93 determines whether or not a connection request has been received from another external device (step S53). In a case in which the communication unit 93 determines that the connection request has been received from the other external device (step S53: YES), the communication unit 93 rejects the connection to the other external device (step S54). On the other hand, in a case in which the communication unit 93 determines that the connection request has not been received from the other external device (step S53: NO), the communication unit 93 skips step S54 and shifts the processing to step S40 (see FIG. 9). With this, the image diagnosis support device 40 maintains a one-to-one connection to the external device.

It is preferable that the communication unit 93 determines whether or not the device is the "other external device" in step S53 on the basis of an internet protocol (IP) address of the external device for which the connection is established in step S53 or an access key transmitted from the external device. In addition, the communication unit 93 may be configured to be connected only to an external device registered in advance by performing authentication on the basis of the IP address or the access key.

Although the X-ray source 10 is a portable type in the above embodiment, the X-ray source 10 may be an X-ray source used in a general X-ray imaging system. In this case, the X-ray source 10 is movably held by, for example, a ceiling-type holding device. In addition, in the general X-ray imaging system, the electronic cassette 20 is used by being attached to an imaging table.

In addition, the X-ray imaging system 2 may be used with a so-called mobile medical vehicle. Further, the X-ray imaging system 2 may be a mammography device, computed tomography (CT), or the like.

In addition, the technology of the present disclosure is not limited to X-rays and can be applied to a system that images a subject using other radiation such as γ-rays.

Furthermore, the image diagnosis support device 40 can also be applied to an ultrasound imaging system that generates an image with ultrasound waves. That is, the image diagnosis support device 40 may perform CAD processing on an ultrasound image as a medical image.

Further, in the above embodiment, the CAD processing unit 92 performs the CAD processing using the detection model 91 which is a trained model generated by machine learning, but the technology of the present disclosure is not limited to the method using machine learning, and software for performing CAD processing through image analysis may be used. In addition, in the above embodiment, the CAD processing unit 92 detects the abnormal shadow through the CAD processing, but the CAD processing unit 92 may detect a site other than the abnormal shadow. For example, the CAD processing unit 92 may detect blood vessels from the ultrasound image in a case in which the CAD processing is performed on the ultrasound image.

Further, in the above embodiment, the X-ray imaging system 2 comprises the repeater 50, but the repeater 50 is not essential, and the console 30 may have the function of the repeater.

In the above embodiment, for example, as a hardware structure of a processing unit that executes various types of processing, such as the CAD processing unit 92 and the communication unit 93, various processors as described below are used. The CAD processing unit 92 may be a CAD processing processor. The communication unit 93 may be a communication processor.

Various processors include a CPU, a programmable logic device (PLD), a dedicated electrical circuit, and the like. As is well known, the CPU is a general-purpose processor that executes software (programs) and functions as various processing units. The PLD is a processor of which the circuit configuration can be changed after manufacturing, such as a field programmable gate array (FPGA). The dedicated electrical circuit is a processor having a dedicated circuit configuration designed to execute specific processing, such as an application specific integrated circuit (ASIC).

One processing unit may be composed of one of these various processors or a combination of two or more of the processors of the same type or different types (for example, a plurality of FPGAs or a combination of a CPU and an FPGA). Alternatively, a plurality of processing units may be composed of one processor. A first example in which a plurality of processing units are composed of one processor is an aspect in which one or more CPUs and software are combined to constitute one processor and the processor functions as the plurality of processing units. A second example is an aspect in which a processor that realizes functions of an entire system including a plurality of processing units with one IC chip is used, as typified by a system on chip (SoC) or the like. As described above, various processing units are composed of one or more of the above various processors, as the hardware structure.

Further, as the hardware structure of these various processors, more specifically, an electric circuit (circuitry) in which circuit elements, such as semiconductor elements, are combined is used.

The present invention is not limited to each of the above embodiments and various configurations may be employed without departing from the gist of the present invention, of course. Further, the present invention extends to a computer-readable storage medium that stores the program non-temporarily, in addition to the program.

What is claimed is:

1. An image diagnosis support device comprising:
   a CAD processing processor that performs computer-aided diagnostic processing on a medical image;
   a communication processor that receives the medical image from an external device and transmits information including a result of the computer-aided diagnostic processing by the CAD processing processor to the external device;
   a power supply circuit that supplies power from a battery to the CAD processing processor and the communication processor;
   a housing that accommodates the CAD processing processor, the communication processor, and the power supply circuit and is portable by a user;
   a first connection portion to which a wireless dongle for wireless communication with the external device is connected; and
   a second connection portion to which a communication cable for wired communication with the external device is connected.

2. The image diagnosis support device according to claim 1,
   wherein a display that displays the medical image is not provided.

3. The image diagnosis support device according to claim 1,
   wherein the housing does not include a user interface operated by the user to input information.

4. The image diagnosis support device according to claim 1,
   wherein the communication processor detects that the first connection portion or the second connection portion is connected to the external device by monitoring a state of link-up with the external device through software control.

5. The image diagnosis support device according to claim 1,
   wherein the communication processor detects that the first connection portion or the second connection portion is connected to the external device by monitoring a current flowing through a light emitting element provided in each of the first connection portion and the second connection portion.

6. The image diagnosis support device according to claim 1,
   wherein the communication processor is connected to one external device through software control in a case in which connection requests have been received from a plurality of the external devices.

7. The image diagnosis support device according to claim 6,
   wherein the communication processor is connected to the one external device specified on the basis of an Internet Protocol address of the external device or an access key transmitted from the external device.

8. The image diagnosis support device according to claim 1,
   wherein the medical image is a radiation image.

* * * * *